United States Patent
Sessions et al.

(10) Patent No.: US 6,636,166 B2
(45) Date of Patent: Oct. 21, 2003

(54) PARALLEL COMMUNICATION BASED ON BALANCED DATA-BIT ENCODING

(75) Inventors: D. C. Sessions, Phoenix, AZ (US); Robert J. Caesar, Jr., Duluth, GA (US); Ivan Svestka, North Riverside, IL (US); David R. Evoy, Tempe, AZ (US); Timothy Pontius, Lake in the Hills, IL (US); Mark Johnson, Elgin, IL (US); Arjan Bink, Chicago, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 302 days.

(21) Appl. No.: 09/871,197

(22) Filed: May 31, 2001

(65) Prior Publication Data

US 2003/0088317 A1 May 8, 2003

(51) Int. Cl.[7] ................................................. H03M 7/00
(52) U.S. Cl. ....................................................... 341/63
(58) Field of Search ............................. 341/63, 99, 101

(56) References Cited

U.S. PATENT DOCUMENTS

| 4,152,697 A | * | 5/1979 | Rider ........................... 341/63 |
| 5,668,548 A | * | 9/1997 | Bakhmutsky ................. 341/63 |

OTHER PUBLICATIONS

Tallini L. et al: Balanced Codes for Noise Reduction in VLSI Systems, International Symposium on Fault Tolerant Computing. Austin, Jun. 15–17, 1994 Los Alamitos, IEEE Comp. Soc. Press, US, vol. Symp. 24, Jun. 15, 1994, pp. 212–218, XP000481786 ISBN : 0–8186–5520–8.

* cited by examiner

Primary Examiner—Brian Young
(74) Attorney, Agent, or Firm—Michael Schmitt; Peter Zawilski

(57) ABSTRACT

In one example embodiment, data is transferred at high speeds over a parallel data bus without loss of data integrity by transferring the data encoded with the quantity of ones relatively the same as the quantity of zeroes. Consistent with one embodiment of the present invention, a bus-interface circuit encodes a set of X data bits into a set of Y data bits, where Y is greater than X. The encoding is implemented to approximately balance the number of ones and the number of zeroes in each set to be transmitted. A specific example application involves encoding the set of X data bits so that there is a balanced number of ones and zeroes in the set of Y data bits. In certain applications, the present invention is implemented to reduce current flow between transmitting and receiving modules and thereby reduce EMI, reduce the number of power pins required for the bus interface, and/or reduce the I/O delay and the skew from voltage sag in the signals passed over the parallel data bus.

20 Claims, 7 Drawing Sheets

PARALLEL COMMUNICATION BASED ON BALANCED DATA-BIT ENCODING

RELATED PATENT DOCUMENTS

The present invention is related to and fully incorporates the subject matter disclosed in concurrently-filed U.S. Patent Applications, No. 09/871,160, entitled "Parallel Data Communication Consuming Low Power" (VLSI.299PA), No. 09/871,159, entitled "Parallel Data Communication Having Skew Intolerant Data Groups" (VLSI.300PA), No. 09/871, 161, entitled "Parallel Data Communication Having Multiple Sync Codes".

FIELD OF THE INVENTION

The present invention is directed generally to data communication. More particularly, the present invention relates to methods and arrangements for transferring data over parallel data circuits and to encoding and decoding schemes for achieving relatively error-free data transfers between nodes.

BACKGROUND OF THE INVENTION

The electronics industry continues to strive for high-powered, high-functioning circuits. Significant achievements in this regard have been realized through the fabrication of very large-scale integration of circuits on small areas of silicon wafer. These complex circuits are often designed as functionally-defined modules that operate on a set of data and then pass that data on for further processing. This communication from such functionally-defined modules can be passed in small or large amounts of data between individual discrete circuits, between integrated circuits within the same chip, and between remotely-located circuits coupled to or within various parts of a system or subsystem. Regardless of the configuration, the communication typically requires closely-controlled interfaces to insure that data integrity is maintained and that circuit designs are sensitive to practicable limitations in terms of implementation space and available operating power.

The demand for high-powered, high-functioning semiconductor devices has lead to an ever-increasing demand for accelerating the speed at which data is passed between the circuit blocks. Many of these high-speed communication applications can be implemented using parallel data transmission in which multiple data bits are simultaneously sent across parallel communication paths. Such "parallel bussing" is a well-accepted approach for achieving data transfers at high data rates. For a given data-transmission rate (sometimes established by a clock passed along with the data), the bandwidth, measured in bits-per-second, is equivalent to the data transmission rate times the number of data signals comprising the parallel data interconnect.

A typical system might include a number of modules that interface to and communicate over a parallel data communication line (sometimes referred to as a data channel); for example, in the form of a cable, a backplane circuit, a bus structure internal to a chip, other interconnect, or any combination of such communication media. A sending module would transmit data over the bus synchronously with a clock on the sending module. In this manner, the transitions over the parallel signal lines leave the sending module in a synchronous relationship with each other and/or to the clock on the sending module. At the other end of the parallel data interconnect, the data is received along with a clock signal; the receive clock is typically derived from or is synchronous with the clock on the sending module. The rate at which the data is passed over the parallel signal lines is sometimes referred to as the (parallel) "bus rate."

In such systems, it is beneficial to ensure that the received signals (and where applicable, the receive clock) have a specific phase relationship to the transmit clock, to provide proper data recovery. There is often an anticipated amount of time "skew" between the transmitted data signals themselves and between the data signals and the receive clock at the destination. There are many sources of skew including, for example, transmission delays introduced by the capacitive and inductive loading of the signal lines of the parallel interconnect, variations in the I/O (input/output) driver source, intersymbol interference and variations in the transmission lines' impedance and length. Regardless of which phenomena cause the skew, achieving communication with proper data recovery, for many applications, should take this issue into account.

For parallel interconnects serving higher-speed applications, in connection herewith it has been discovered that skew is "pattern dependent" and that the severity of this issue can be mitigated and, in many instances, largely overcome. This pattern dependency results in part from the imperfect current sources shared between the data bits in the parallel bus. The shared current sources induce skew at the driver, which directly reduces margin at the receiver, which in turn can cause data transmission errors.

More particularly, it has been discovered that when the digital data set, being sent over a high-speed parallel communication line, suddenly changes between a set of logical zeroes and a set of logical ones, the received signals are delayed due to the effect of the impedance levels (resistive, inductive and/or capacitive) in the lines feeding the internal Vdd and Vss pads. The internal Vdd and Vss pads provide the power that is shared by the respective data-transmitting output drivers. Consider, for example, the situations when the digital data, being sent over the high-speed parallel communication line, is a set of logical zeroes; each of the respective data output drivers is sinking current through its Vss pin to maintain the data-communication line at a logic low level and virtually no current is being drawn by each output driver's Vdd pin. Assuming that the digital data being sent over the parallel communication line is suddenly switched from the set of logical zeroes to a set of logical ones, there would be a significant change (e.g., increase) in the current levels flowing between the internal Vdd and Vss pads and the respective Vdd and Vss nodes of each output driver. The Vdd will increase in current flow and the Vss will decrease in current flow.

This data-dependent current change causes large current fluctuations at the internal Vdd and Vss pads which, in turn, result in significant voltage drops across the series resistance and inductance inherent in the lines feeding the internal Vdd and Vss pads. Because the output drivers cannot suddenly change from a logical zero to a logical one until the voltage at the Vdd and Vss nodes of the output drivers recovers, there can be significant delays before the transmitted data signals fully reach the minimum voltage levels necessary to characterize the signals as logical ones. Consequently, such communication results in signal transmission delays, or skew between the signals and the receive clocks. In the higher-speed applications, this skew effect can be a significant percentage of the clock frequency; therefore the likelihood of data degradation increases. With advancements requiring further reductions in the power supply levels and further increases in clock rates, this skewing problem becomes more pronounced.

For high-speed data-transmission applications, there are various other disadvantages. For example, many interfaces are designed without sufficient consideration of the space and material costs in the number of power nodes and conductors required for passing such high-speed data signals over the parallel busses. By reducing the rate of current consumption for this high-speed communication, the number of power nodes and conductor pins can be reduced; in a power-critical application, such reductions can be significant. Moreover, reducing the current flow in high-speed parallel data communication applications can substantially reduce electromagnetic interference ("EMI") which, in turn, can reduce the likelihood of signal recovery problems at the receiving module and thereby reduce the need for expensive and often burdensome EMI shielding.

Accordingly, improving data communication over parallel busses permits more practicable and higher-speed parallel bussing applications which, in turn, can directly lead to higher-powered, higher-functioning circuits that preserve data integrity and are sensitive to needs for reducing implementation space and power consumption.

SUMMARY OF THE INVENTION

Various aspects of the present invention are directed to data transfer over parallel-communication line circuits in a manner that addresses and overcomes the above-mentioned issues and can be used in conjunction with the embodiments disclosed in the above-mentioned patent documents. In one application involving a high-speed data transfer over a parallel data circuit, an example embodiment of the present invention permits significant increases in the data-transmission rate while maintaining data integrity. In certain embodiments, the present invention reduces current flow between transmitting and receiving modules and thereby causes a reduction in EMI, reduces the number of power pins (or, more generally, power nodes) required for the parallel data, and/or reduces the I/O delay and the skew from voltage sag in the signals passed over the parallel data interconnect.

One particular example embodiment involves a data communication arrangement in which digital data is transferred in parallel. The arrangement includes a communication channel and an interface circuit. The communication channel is adapted to transfer the digital data, and the interface circuit is coupled to the communication channel and adapted to process a set of X bits of the digital data. Each set of X bits is converted to a unique set of encoded Y bits, where Y is greater than X, with the encoding designed to increase the balance between the number of ones and the number of zeroes in the set of Y bits. By increasing this balance, the overall power consumption by the parallel-bit drivers remains relatively constant and skew, otherwise caused by fluctuations in the voltage rails at the drivers, is largely mitigated.

According to a method implementation, the present invention is directed to a method for passing digital data between first and second nodes interconnected via a parallel communication channel. The parallel communication channel and a clock communication path are adapted to transfer the digital data at the data-transmission rate. A parallel data circuit is adapted to process (e.g., read, write and/or interpret) a set of X bits of the digital data. The set of X bits is encoded into a set of Y bits, where Y is greater than X and to increase the exact balance between the number of ones and the number of zeroes in the set of Y bits.

According to another example embodiment of the present invention, the set of X data bits is encoded so that there is a balanced number of ones and zeroes in each set of Y data bits.

Other example embodiments of the present invention are respectively directed to the encoding, decoding and system-processing aspects of such interfaces.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 1b is a voltage plot of the internal Vdd and Vss signals in response to a transmission on the parallel data communication arrangement side of the I/O pads, corresponding to an unbalanced data transmission, for example, as could be implemented by the data-transmitting module shown FIG. 1a;

Figure 1A:
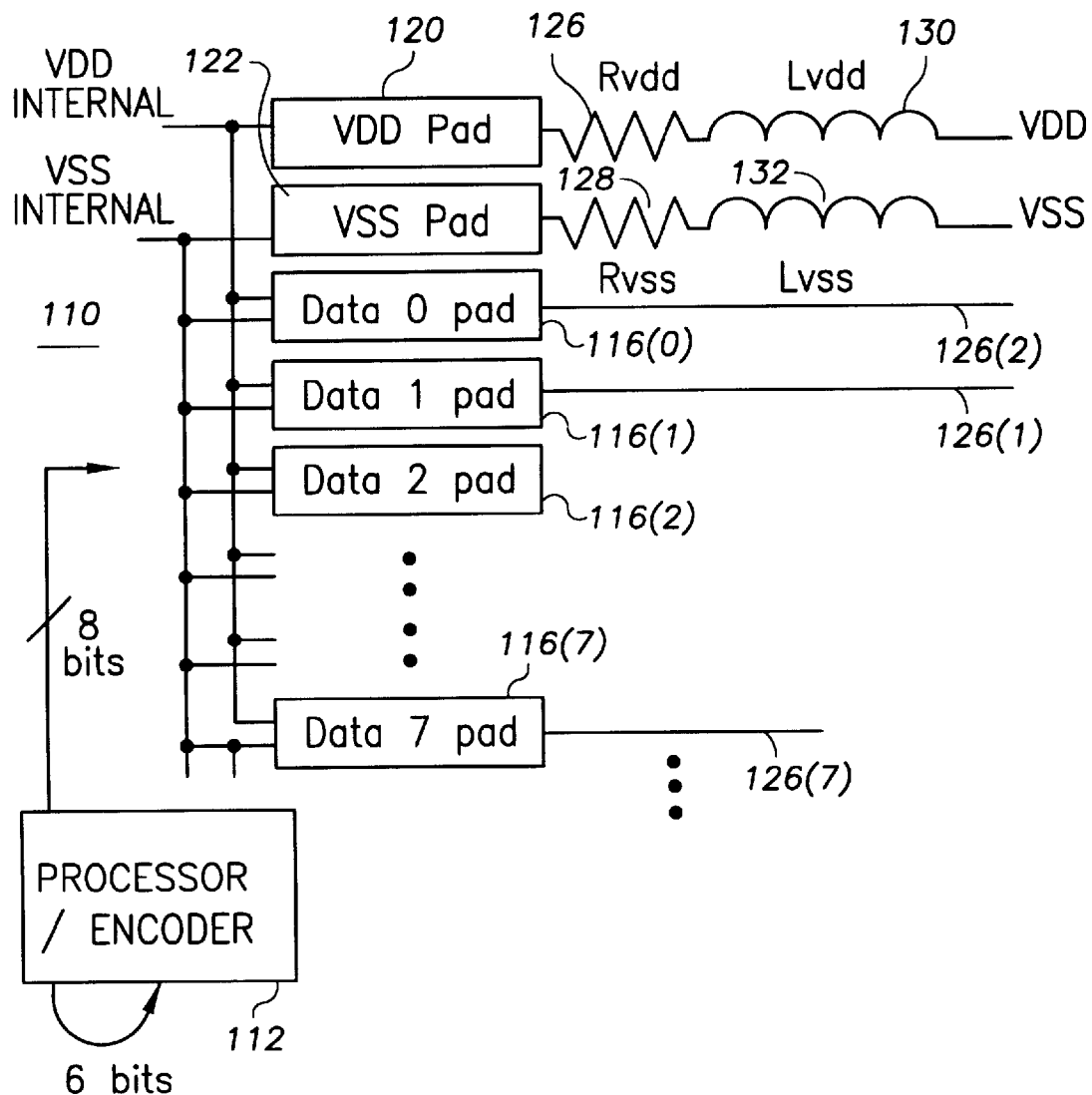
FIG. 1a is a diagram of a data-transmitting module with its I/O pads connected to a parallel-data communication line arrangement, that includes a processor with encoding methodology according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF VARIOUS ILLUSTRATED EMBODIMENTS

The present invention is believed to be generally applicable to methods and arrangements for transferring data between two modules (functional blocks) intercoupled by a parallel data communication path. The invention has been found to be particularly advantageous for high-speed data transfer applications requiring or benefiting from preservation of data integrity and reductions in implementation space and power consumption. Examples of such applications include, among others, SSTL (stub series transceiver logic), RSL (Rambus Signaling Logic) interfaces, closely-connected applications such as where the parallel data communication path intercouples the two modules on a single-chip, off-board high-speed communication between chips immediately adjacent to each other on the same printed circuit board such as on a reference-chip development platform of the type disclosed in U.S. patent application Ser. No. 09/215,942, filed on Dec. 18, 1998, now U.S. Pat. No. 6,347,395. While the present invention is not necessarily limited to such applications, an appreciation of various aspects of the invention is best gained through a discussion of examples in such an environment.

According to one example embodiment of the present invention, a parallel data communication arrangement passes digital data at a rate set by clock signals that are carried along with the data lines of the parallel data bus. The arrangement further includes an interface circuit adapted to encode onto the parallel data lines a set of X bits of the digital data as an encoded set of Y bits, where Y is greater than X. For example, in one application X is 4 and Y is 8, and in another application X is 8 and Y is 10. The encoding is performed by converting the data set of X bits into the set of Y bits with a bias toward balancing the quantity of ones and zeroes in the set of encoded bits. By improving the balance between the quantity of ones and zeroes, the implementation can be used to reduce the current flow between transmitting and receiving modules and thereby reduce EMI, reduce the number of power pins (or, more generally, power nodes) required for the interconnect interface, and/or reduce the I/O delay and the skew in the signals passed over the parallel data bus.

Turning now to the drawings, FIG. 1a illustrates an example parallel data communication arrangement 110, according to the present invention. The arrangement 110 includes a processor circuit 112 including an internal program or circuit adapted to encode sets of 6 bits of digital data into sets of 8 bits. The processor circuit 112 employs its internal program or circuit using, for example, a lookup table or conversion algorithm (not shown), to implement an encoding scheme that provides a balance, or an approximation thereof (i.e. the same or almost the same), between the quantity of ones and the quantity of zeroes in the set of encoded bits of data. For example, should the processor circuit 112 need to transmit a data value corresponding to "000 000", this might be encoded to "0000 1111" so that the number of logical zeroes is equal to the number of logical ones. The processor circuit 112 outputs the encoded "0000 1111" to the 8 "Data _Pads" (or output drivers) 116(0)116 (7).

The Vdd and Vss power pads (or sources) 120 and 122 are typically arranged internal to an IC along with each of the respective data pads 116 to which they supply power. In this manner, the respective data pads 116 compete in drawing current from the same current source 120 and 122. By sending the data values encoded as a balanced set of zeroes and ones (e.g., sending "000 000" as "0000 1111"), when the digital data being sent over the parallel communication lines 126(0–7) suddenly changes, the aggregate number of logical zeroes and the aggregate number of logical ones remains the same. Consequently, the current drawn from the current source 120 and 122 remains nearly constant, and there is not a significant change in the current levels flowing between the internal Vdd and Vss pads and the respective Vdd and Vss nodes of each data pad 116. In a typical application realizing benefit from the above skew-mitigation approach, each 6-bit data value would have a corresponding zero-one balanced 8-bit code.

Figure 1B:
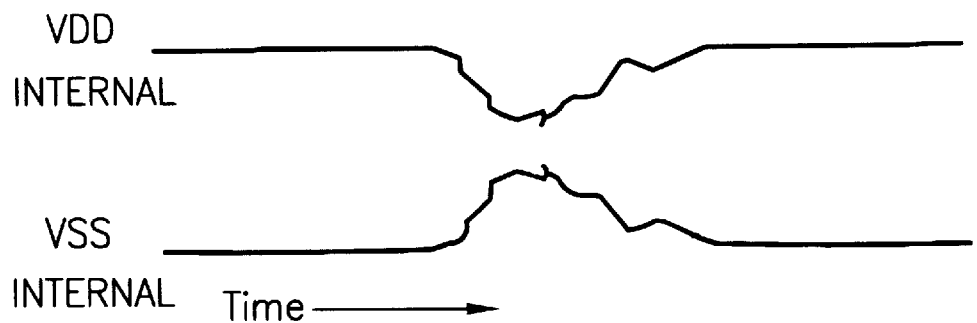

As discussed previously, if the current drawn from the current source (internal Vdd and Vss pads 120 and 122) were not to remain the same, there would be a change in the current levels drawn at the respective Vdd and Vss nodes of each data pad 116, with this change in current being proportional to the sudden disparity in the quantity of logical ones and the quantity of logical zeroes being transmitted. A voltage drop would ensue across the series resistance 126 and 128 and inductance 130 and 132 inherent in the lines connecting to the Vdd and Vss nodes. The result would be significant sags in the internal Vdd and Vss voltages as depicted in FIG. 1b, and these sags would cause skew between the signals and the receive clocks.

The above approach of encoding the data values to increase the zero-one balance at the output of the driver can be varied to accommodate particular applications including a wide range of data-transmission or data-coding specifications. For example, in an application that is less sensitive to skew, one such variation only ensures an approximate balance between zeroes and ones. In such an implementation, "000 000" might be encoded to "0001 1111"; although the number of zeroes is not exactly equal to the number of ones, the respective quantity of zeroes and ones approximate each other. In applications requiring an odd number of parallel data bits, such an approximation is of course necessary since the number of zeroes cannot be exactly equal to the number of ones. Another application is where more codes are needed than what would otherwise be available for the exact balancing between the number of ones and zeroes; ideally, those codes that provide the exact zero-one balance would be used for the data expected to be transmitted most frequently. The skilled artisan will appreciate that the respective quantity of zeroes and ones do not approximate each other when this differential causes the voltage rails of FIG. 1b to sag unduly. For example, in one application if there is a sag by more than about 10%, or when the ratio of zeroes to ones is less than 0.6 (3/5) or greater than 1.67 (5/3), depending on the transmission frequency, then the circuitry and the application(s) will not tolerate the resultant skew. Therefore, the invention does not consider this binary-bit relationship to provide "approximate" balance.

Figure 2:
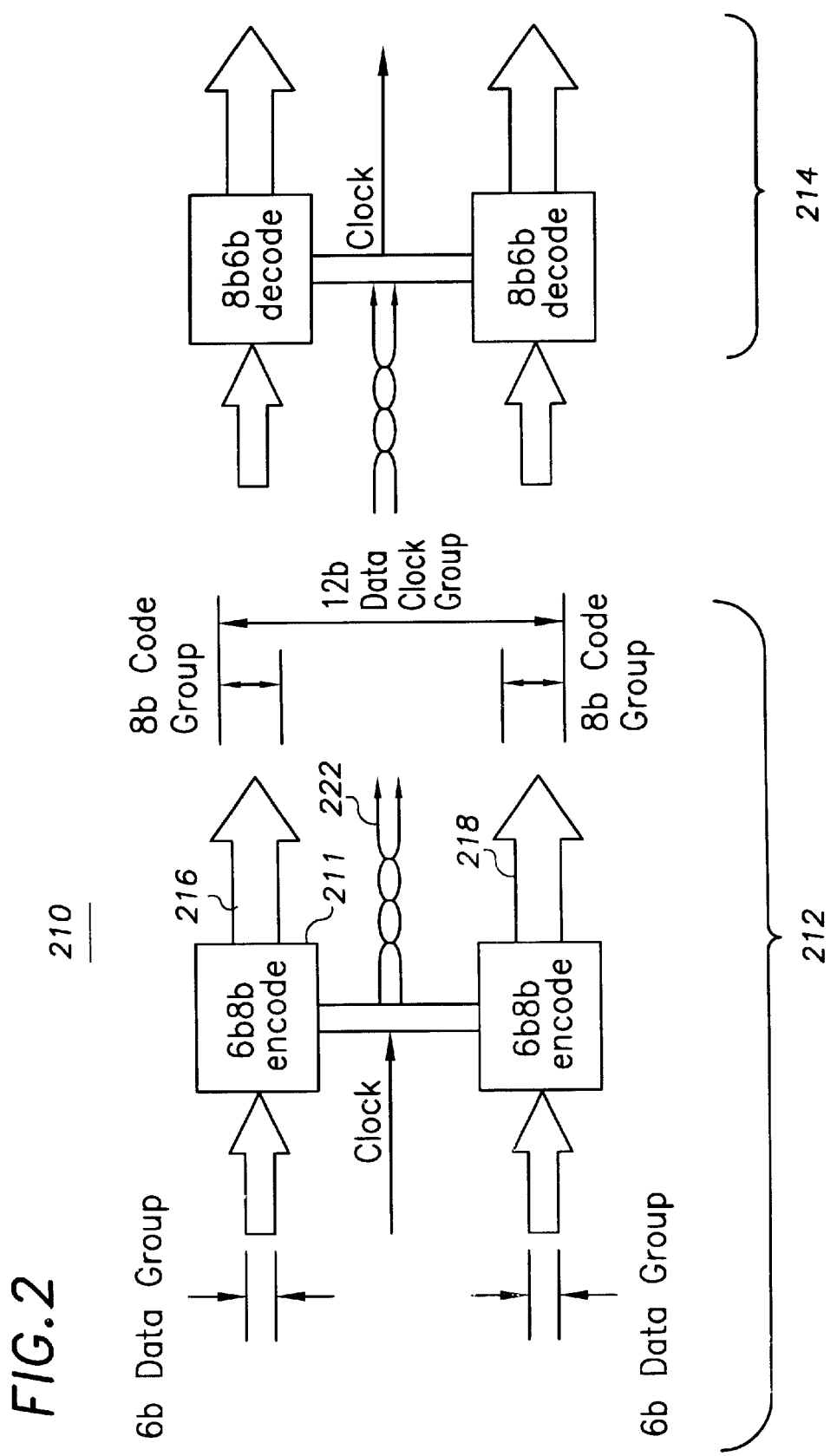
FIG. 2 is a diagram of a parallel data communication line arrangement, according to an example implementation of the present invention.

FIG. 2 illustrates a parallel-data communication line arrangement 210, according to another example implementation of the present invention. Related to the previous example embodiments, the arrangement passes 210 uses a data-value encoding approach in which data values are encoded by circuit 211 and then passed, from a sending module 212 to a receiving module 214, using parallel data lines 216 and 218 along with clock lines 222. The clock lines 222 provide the data-communication rate and synchronization between sending and receiving modules 212 and 214. At the receiving module 214, a processor or other decoder circuit 230 uses a reciprocal algorithm, lookup table or equivalent circuit to decode the data value back to its 6-bit data value.

The arrangement 210 is directed to an application involving 6-bit data ("6b") groups, 8-bit data ("8b") groups, and 12-bit data clock (12b DC) groups. The 12b DC groups efficiently encode communications of data or commands of 12 signals. In some cases, it may be advantageous to use smaller groups. A 12b DC group includes a differential clock pair and two 6b8b encodes, for a total of 18 pins between the sending module 212 and the receiving module 214. One half of the 12b DC group includes one 6b8b encoder and a differential clock pair, for a total of 10 pins. Un-encoded differential pairs can also be used to transport signals. These differential pairs can share the clock signal used with one half of a 12b DC group, or the differential pairs can have their own clock pair.

A number of different 6b8b encoding approaches can be used; a first example 6b8b encoding approach is as follows (alphanumeric characters in hexidecimal):

The above coding scheme can be expressed as follows:

E7=!D5\*!D4\*!D2+!D5+!D5\*!D4\*!D3\*!D2+
!D5\*D4\*D3\*!D1+D5\*!D4\*!D1+D5\*D4\*!D1

E6=!D5\*!D4\*!D2+!D5+!D5\*D4\*!D3\*!D2+
!D5\*D4\*D3\*D1+D5\*D1

E5=!D4\*!D3\*D2+!D5\*!D4\*D3\*!D1+!D5\*D4\*!D3\*!D1+
!D5\*D4\*D3\*!D2+!D5\*!D4\*D3\*!D0+D5\*D4\*!D0

E4=!D4\*!D3\*D2+!D5\*!D4\*D3\*D1+!D5\*D4\*!D3\*D1+
!D5\*D4\*D3\*!D2+D5\*!D4\*D3\*D0+D5\*D4\*D0

E3=!D5\*!D4\*!D3\*!D1+!D5\*D4\*D3\*D2+!D5\*D4\*!D0+
D5\*!D2

E2=!D5\*!D4\*!D3\*D1+!D5\*!D4\*D3\*D2+!D5\*D4\*D0+
D5\*!D4\*!D2+D5\*D4\*D2

E1=!D5\*!D4\*!D0+!D5\*D4\*D2+D5\*!D4\*!D3\*!D0+
D5\*D4\*D3\*D2+D5\*D4\*D3

E0=!D5\*!D4\*D0+!D5\*D4\*D2+D5\*!D4\*!D3\*D0+
D5\*!D4\*D3\*D2+D5\*D4\*D3

In the above coding scheme, E0–E7 represent the 8 bits corresponding to the encoded data value and to be output by the driver, D0–D5 represent the 6 bits corresponding to the unencoded data value, and "!" denotes the complement of the input bit immediately adjacent. The above coding scheme uses only 64 of the available 256 codes for transmission over the 8 bits of parallel data. Special codes can be assigned to the remaining undesignated balanced codes e.g., 0x33, 0x3C 0xC3 and 0xCC can be assigned as synchronization codes.

The encode flow control, which is not encoded, is sent between modules as an asynchronous signal. The other signals are divided into groups of 12. For all complete groups, 12b DC groups are used. An example encoding approach for the remaining signals is shown as follows in Table 1:

TABLE 1

| Support for partial DC groups | Ref | Size of Partial Group | | | | | | | | | | |
|---|---|---|---|---|---|---|---|---|---|---|---|---|
| Type of encoding | 12 | 11 | 10 | 9 | 8 | 7 | 6 | 5 | 4 | 3 | 2 | 1 |
| 12b DC group (18) | 1 | 1 | 1 | 0 | 0 | 0 | 0 | 0 | 0 | 0 | 0 | 0 |
| ½ 12b DC group (10) | 0 | 0 | 0 | 1 | 1 | 1 | 1 | 1 | 1 | 0 | 0 | 0 |
| Differential Signal Pairs | 0 | 0 | 0 | 3 | 2 | 1 | 0 | 0 | 0 | 3 | 2 | 1 |
| Unused data bits | 0 | 1 | 2 | 0 | 0 | 0 | 0 | 1 | 2 | 0 | 0 | 0 |
| Clock pair for differential Signals (2) | 0 | 0 | 0 | 0 | 0 | 0 | 0 | 0 | 0 | 1 | 1 | 1 |
| Package pins | 18 | 18 | 18 | 16 | 14 | 12 | 10 | 10 | 10 | 8 | 6 | 4 |

Group sizes of 1 to 3 bits are done with individual differential pairs and a clock pair without any associated DC group. When implementing with clock groups of these sizes, a conventional synchronization transmission method is also recommended, optionally with both lines high or both lines low.

The communication used for differential signaling employ the same transmission scheme as the 6b8b groups but are essentially very small groups, using 1b2b encoding. The following tables 2 and 3 respectively illustrate useful 1b2b signal coding and differential clock coding:

TABLE 2

| Signal | xxP | xxN | Description |
|---|---|---|---|
| 0 | 0 | 1 | Signal a "0" |
| 1 | 1 | 0 | Signal a "1" |
| x | 0 | 0 | Reserved |
| x | 1 | 1 | Reserved |

TABLE 3

| xxP | xxN | Description |
|---|---|---|
| 0 | 1 | Transition to this state is a clock edge |
| 1 | 0 | Transition to this state is a clock edge |
| 0 | 0 | Illegal |
| 1 | 1 | Illegal |

Figures 1, 3:
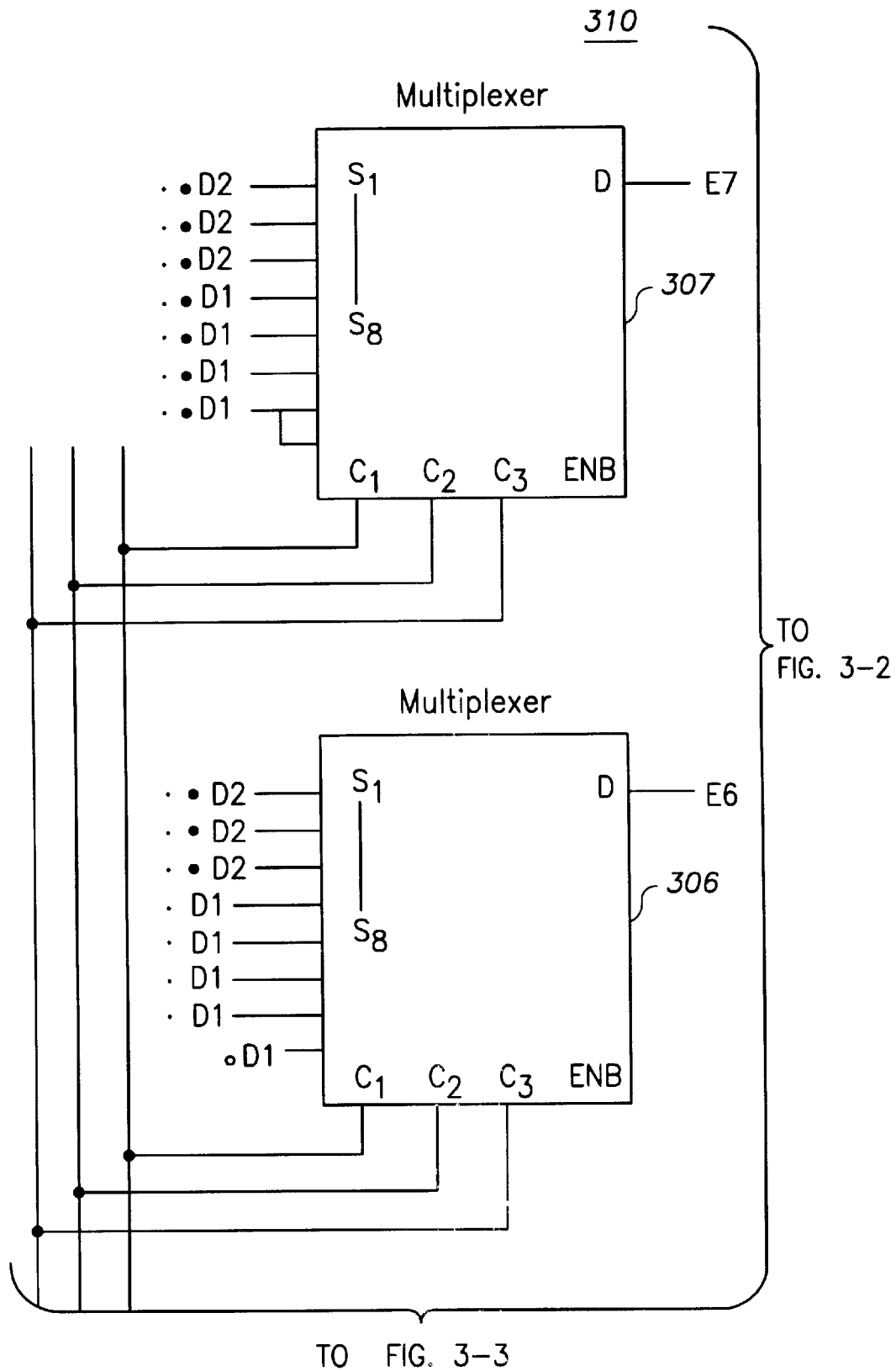
FIG. 3 illustrates a 6-bit to 8-bit encoding arrangement, according to a more specific example implementation of the present invention.
Figures 2, 3:
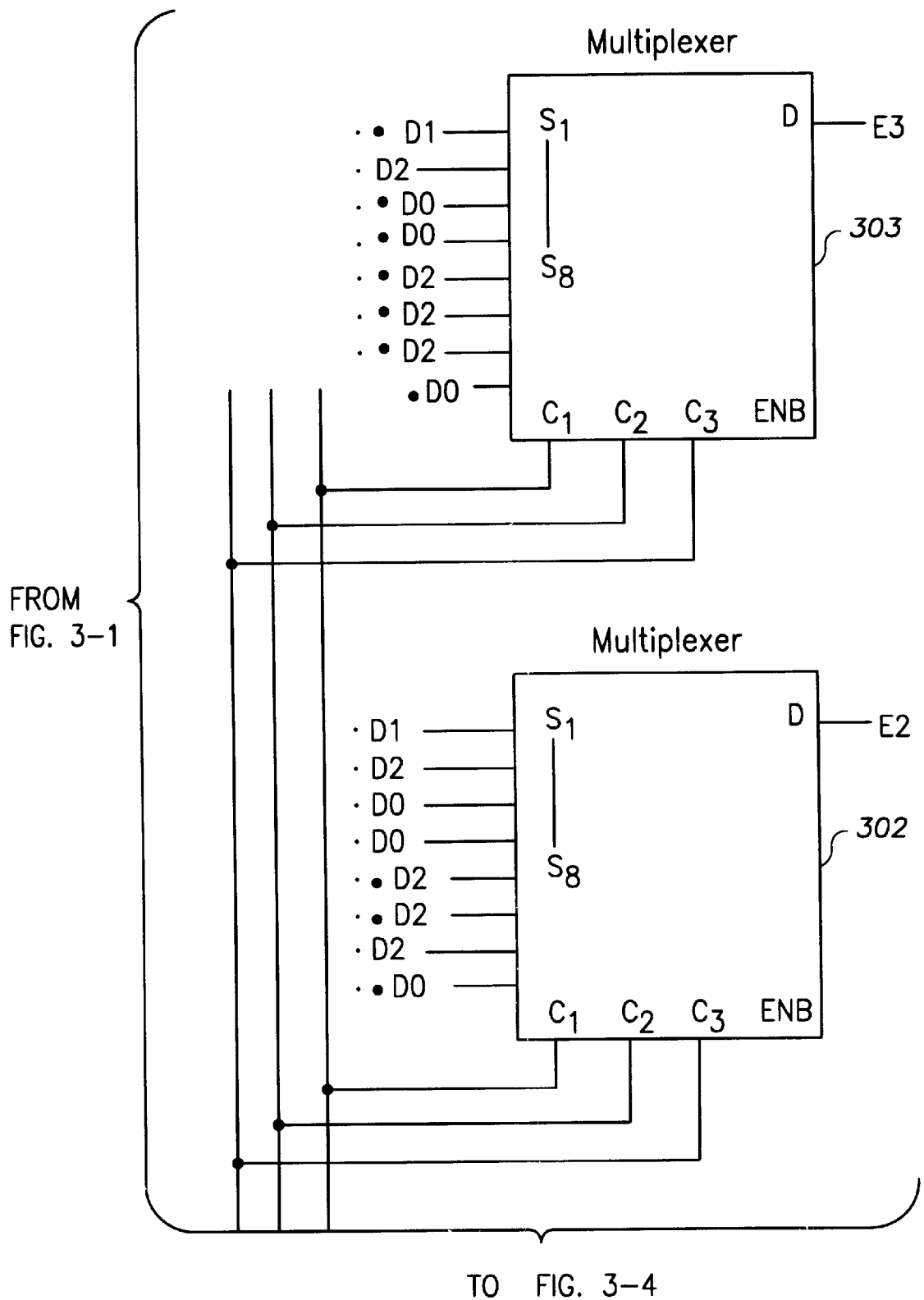
Figure 3:
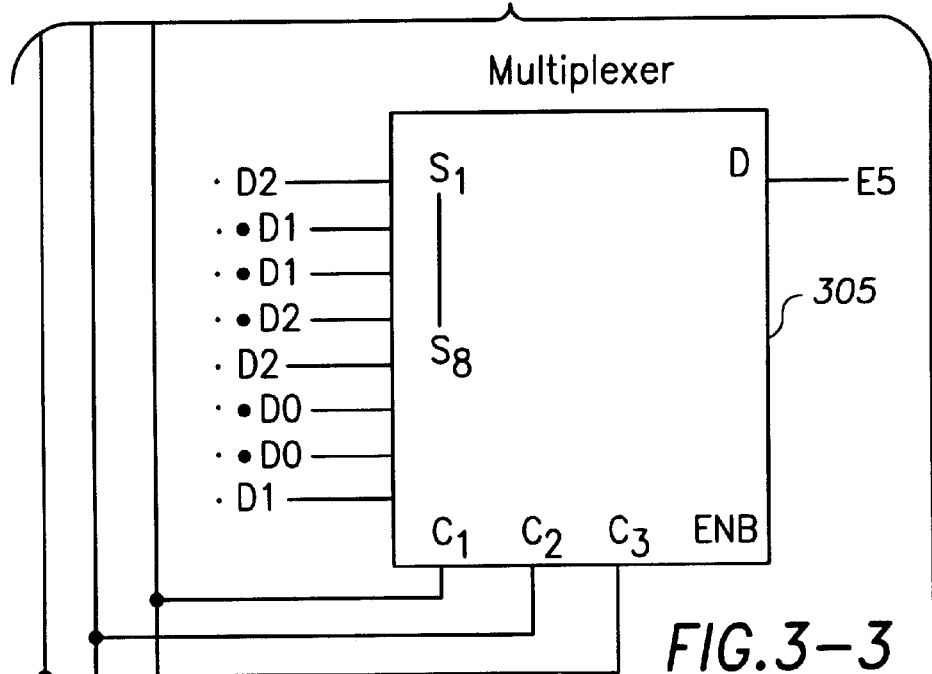
Figure 3:
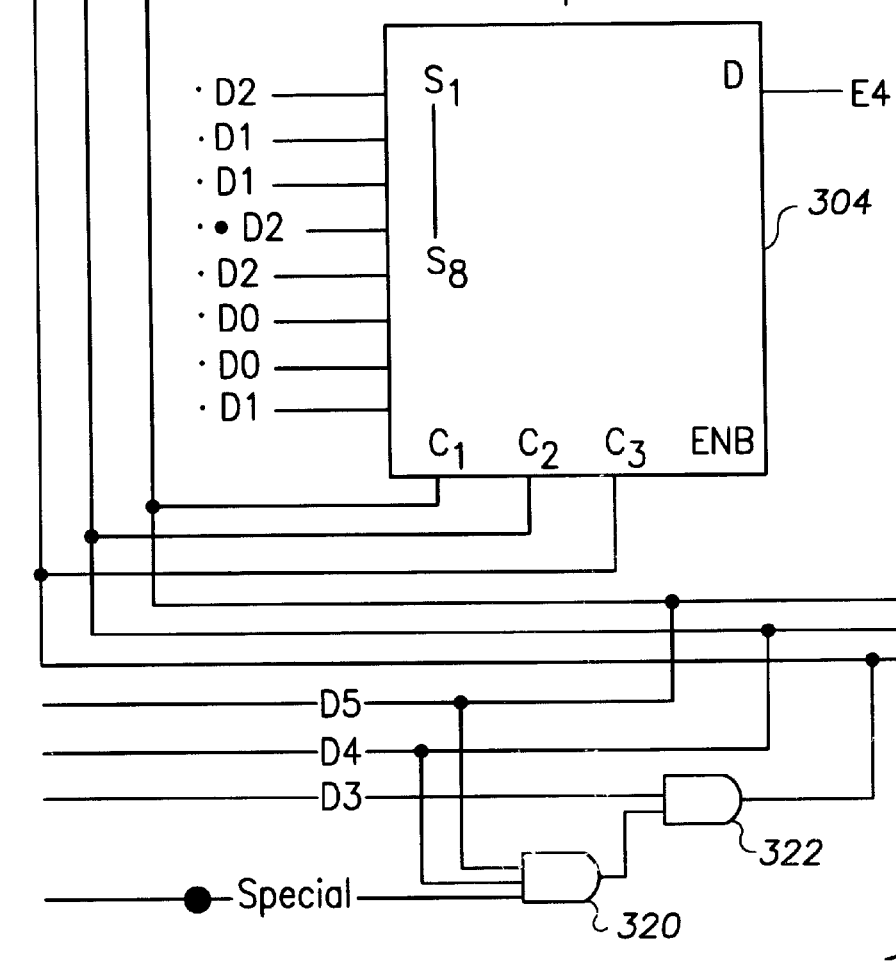
Figure 3:
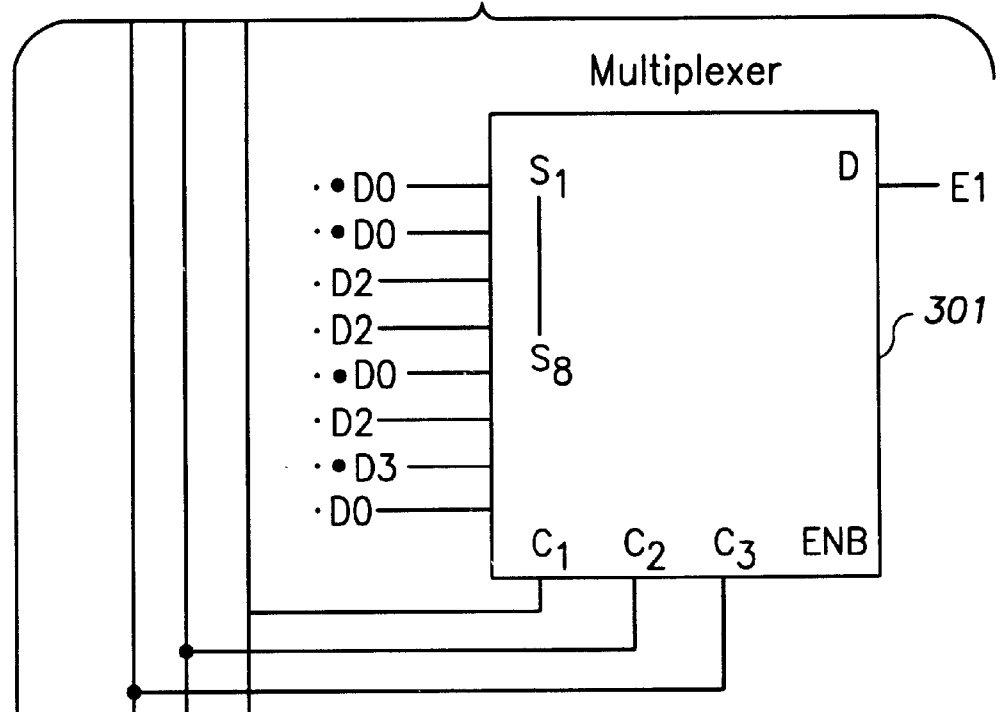

FIG. 3 illustrates a multiplexer-based encoder circuit 310 which is useful, for example, in the implementation of the above-discussed example 6b8b encoding approach. The encoder circuit of FIG. 3 includes eight multiplexers denoted 300 through 307. The output of each multiplexer provides ones of the eight bits of the "8b" encoded data set; these outputs are respectively denoted "E0" through "E7" for multiplexers 300 through 307. Each multiplexer includes eight data inputs, each receiving one of the six bits of the "6b" un-encoded data set (D0 through D5).

In one specific implementation that employs a processor having at least six data bits, the least-significant five (D0–D3) of the eight data bits are selectively coupled to drive the multiplexer inputs, and the three select inputs to each of the multiplexers 300 through 307 are driven by the next most-significant three (D3–D5) of the eight data bits. The encoder circuit of FIG. 3 further includes some conventional logic circuits 320 and 322 which are selectively driven from the processor's data bus to transmit specially-designated codes.

Another encoding 6b8b approach is as follows:

| 6b | 00 | 01 | 02 | 03 | 04 | 05 | 06 | 07 | 08 | 09 |
|----|----|----|----|----|----|----|----|----|----|----|
| 8b | a6 | a5 | ac | c3 | a3 | c5 | c6 | 47 | aa | c9 |
| 6b | 0a | 0b | 0c | 0d | 03 | 0f | 10 | 11 | 12 | 13 |
| 8b | ca | 4b | cc | 4d | 43 | 0f | b1 | d1 | d2 | 53 |
| 6b | 14 | 15 | 16 | 17 | 18 | 19 | 1a | 1b | 1c | 1d |
| 8b | d4 | 55 | 56 | 17 | d8 | 59 | 5a | 1b | 5c | 1d |
| 6b | 1e | 1f | 20 | 21 | 22 | 23 | 24 | 25 | 26 | 27 |
| 8b | 1e | 87 | b8 | e1 | e2 | 63 | e4 | 65 | 66 | 27 |
| 6b | 28 | 29 | 2a | 2b | 2c | 2d | 2e | 2f | 30 | 31 |
| 8b | e8 | 69 | 6a | 2b | 6c | 2d | 2e | 8e | f0 | 71 |
| 6b | 32 | 33 | 34 | 35 | 36 | 37 | 38 | 39 | 3a | 3b |
| 8b | 72 | 33 | 74 | 35 | 36 | 95 | 78 | 39 | 3a | 9c |
| 6b | 3c | 3d | 3e | 3f | sync code | | | | | |
| 8b | 3c | 93 | 9a | 99 | a9 | | | | | |

Figure 4:
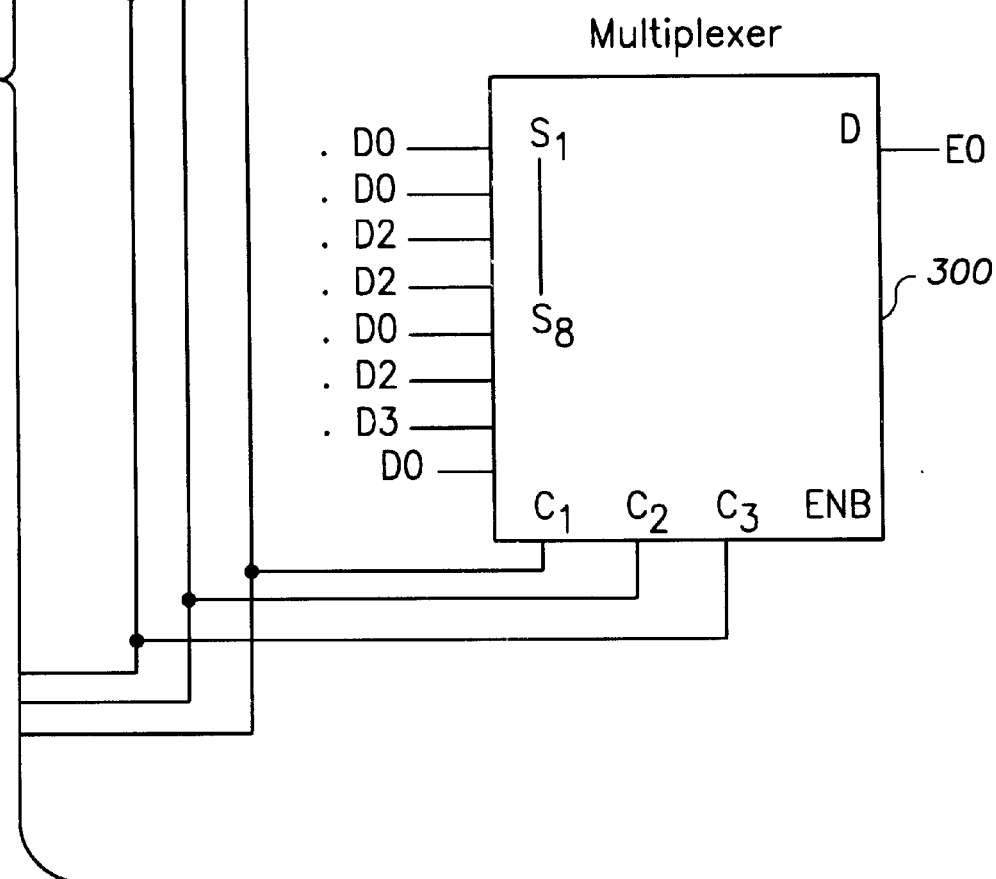
FIG. 4 illustrates another example embodiment of a process for encoding 6 bits of data into 8 bits, according to the present invention.
Figure 4:
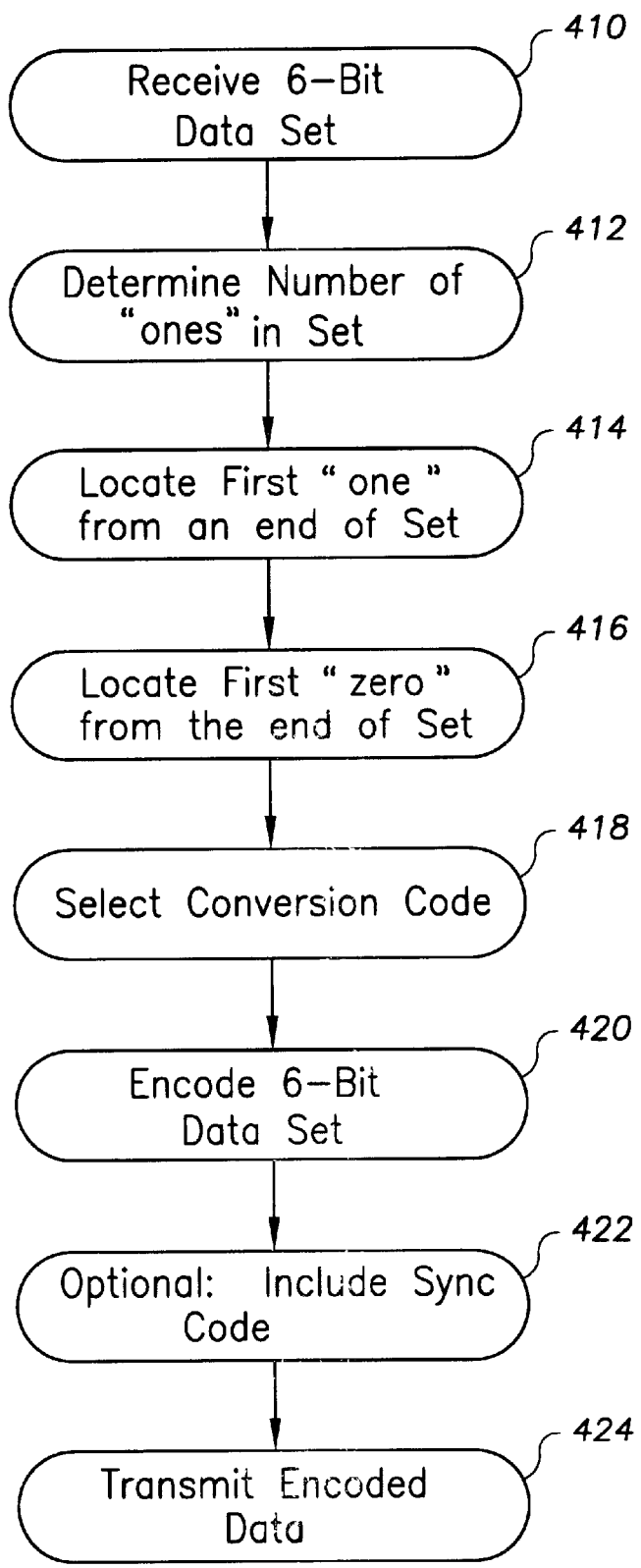

While various circuit implementations can be used for the encoding and decoding of the selected coding, FIG. 4 illustrates an example embodiment of a process for encoding 6 bits of data into 8 bits, according to the immediately-preceding 6b8b encoding approach. After receiving the 6-bit data set (block 410), the encoder circuit determines the number of ones in the set (block 412). Using the right or left end as an ongoing reference, the first "one" from the end of the set is located (block 414) and the first "zero" from the end of the set is located (block 416). The conversion code is then selected and processed as depicted at blocks 418 and 420. As illustrated in connection with blocks 422 and 424, a synchronization code 422 is optionally used and the encoded data is then transmitted to the receiving module.

Various aspects of the present invention address the above-mentioned deficiencies and also provides for communication methods and arrangements that are useful for other applications. The present invention should not be considered limited to the particular examples described above. Various modifications, equivalent processes, as well as numerous structures to which the present invention may be applicable fall within the scope of the present invention. For example, the above-described implementations should not be construed as necessarily limiting the claimed invention. The skilled artisan will appreciate that other communication arrangements are also acceptable, and that multi-chip or single-chip arrangements can be implemented using a similarly constructed one-way or two-way interface for communication between the chip-set arrangements, and that the severity of skew and the need to exactly balance (versus approximate) is dependent on the specified design and related particulars such as the current draw of each output driver, the magnitudes of the impedance in the lines feeding the Vdd and Vss pads, and the number of bits in the parallel communication path. Such variations may be considered as part of the claimed invention, as fairly set forth in the appended claims.

What is claimed is:

1. A parallel data communication arrangement in which digital data including logical ones and zeroes is transferred in parallel, the arrangement comprising:
    a communication channel including a parallel data-carrying circuit, the communication channel adapted to transfer the digital data; and
    an interface circuit coupled to the communication channel and adapted to process sets of X bits of the digital data, each set of X bits being converted to a unique one of a plurality of sets of encoded Y bits, where X and Y are positive integers and Y is greater than X, each one of the encoded sets of Y bits consisting of, at least, approximately the same quantity of ones and zeroes.

2. The parallel data communication arrangement of claim 1, wherein the interface circuit includes an encoder circuit adapted to encode the set of X bits into the set of Y bits.

3. The parallel data communication arrangement of claim 1, wherein the bus interface circuit includes a decoder circuit adapted to decode the set of Y bits into the set of X bits.

4. The parallel data communication arrangement of claim 3, wherein the decoder circuit includes a logic circuit.

5. The parallel data communication arrangement of claim 1, wherein the encoded set of Y data bits consists of the same quantity of ones as the quantity of zeroes.

6. The parallel data communication arrangement of claim 1, wherein the interface circuit further includes an encoder circuit at one node of the communication channel, the encoder circuit being adapted to encode the set of X bits into a set of Y bits, and further includes a decoder circuit at another node of the communication channel that is adapted to decode the set of Y bits into the set of X bits.

7. The parallel data communication arrangement of claim 6, wherein the set of X data bits is encoded so that there is a balanced number of ones and zeroes in the set of Y data bits.

8. The parallel data communication arrangement of claim 6, wherein X equals 6 and Y equals 8.

9. The parallel data communication arrangement of claim 8, further including an I/O parallel data interconnect and a plurality of I/O modules sending and receiving encoded Y data using the I/O parallel data interconnect.

10. The parallel data communication arrangement of claim 9, wherein the parallel interconnect circuit includes a clock-signal communication path carry a clock signal synchronized to the encoded Y bits.

11. A method of parallel data communication in which digital data including logical ones and zeroes is transferred in parallel over a communication channel that includes a parallel circuit, the method comprising:
    transferring the digital data over the communication channel;
    coupling to the communication channel and processing sets of X bits of the digital data, each set of X bits being converted to a unique one of a plurality of sets of encoded Y bits, where X and Y are positive integers, Y is greater than X, and the quantity of ones is, at least, approximately the same as the quantity of zeroes in each set of encoded Y bits.

12. The method of claim 11, wherein processing includes encoding the set of X bits into the set of Y bits.

13. The method of claim 11, wherein processing includes decoding the set of Y bits into the set of X bits.

14. The method of claim 11, wherein processing includes encoding the set of X bits into the set of Y bits, transmitting and then receiving the encoded digital data over the bus, and then decoding the set of Y bits into the set of X bits.

15. The method of claim 11, wherein X equals 6 and Y equals 8.

16. The method of claim 11, wherein the set of X data bits is encoded so that there is a balanced number of ones and zeroes in the set of Y data bits.

17. The method of claim 11, wherein the set of X data bits is encoded so that there is a balanced number of ones and zeroes in the set of Y data bits, wherein X equals 6 and Y equals 8, wherein processing includes encoding and decoding the bits communicated over the communication channel, and wherein the communication channel includes a clock-signal communication path.

18. A parallel data communication arrangement in which digital data including logical ones and zeroes is transferred in parallel over a communication channel, the arrangement comprising:

means for transferring the digital data over the communication channel; and means for coupling to the communication channel and processing a set of X bits of the digital data, each set of X bits converted to a unique one of a plurality of sets of encoded Y bits, where X and Y are positive integers, Y is greater than X, and the quantity of ones is, at least, approximately the same as the quantity of zeroes in each set of encoded Y bits.

19. The parallel data communication arrangement of claim 18, wherein Y is an odd number.

20. The parallel data communication arrangement of claim 18, wherein the set of X data bits is encoded so that the number of ones equals the number of zeroes in each set of Y data bits.

* * * * *